(12) United States Patent
Myers

(10) Patent No.: US 8,483,646 B2
(45) Date of Patent: Jul. 9, 2013

(54) SECOND ORDER INTERMODULATION CANCELLER

(75) Inventor: John P. Myers, Fremont, CA (US)

(73) Assignee: Linear Technology Corporation, Milpitas, CA (US)

( * ) Notice: Subject to any disclaimer, the term of this patent is extended or adjusted under 35 U.S.C. 154(b) by 105 days.

(21) Appl. No.: 13/323,744

(22) Filed: Dec. 12, 2011

(65) Prior Publication Data

US 2013/0149981 A1 Jun. 13, 2013

(51) Int. Cl.
*H04B 1/16* (2006.01)
(52) U.S. Cl.
USPC .......................................... 455/323; 455/326
(58) Field of Classification Search
USPC ............................. 455/323, 324, 326, 333, 334
See application file for complete search history.

(56) References Cited

U.S. PATENT DOCUMENTS

| | | | |
|---|---|---|---|
| 7,259,569 B2 | 8/2007 | Kim | |
| 7,421,263 B2* | 9/2008 | Kim | 455/234.1 |
| 7,657,241 B2 | 2/2010 | Shah | |
| 7,929,938 B2* | 4/2011 | Sellars et al. | 455/333 |
| 7,991,376 B2* | 8/2011 | Ko et al. | 455/323 |
| 8,000,676 B2 | 8/2011 | Kim et al. | |
| 8,050,649 B2 | 11/2011 | Chen et al. | |
| 2006/0145706 A1 | 7/2006 | Kim | |
| 2007/0049215 A1 | 3/2007 | Chen et al. | |
| 2008/0116902 A1 | 5/2008 | Kim et al. | |
| 2009/0140789 A1 | 6/2009 | Birth | |
| 2009/0239495 A1 | 9/2009 | Sellars et al. | |

OTHER PUBLICATIONS

Minghui Chen et al., "Active 2nd Order Intermodulation Calibration for Direct-Conversion Receivers", Digest of Technical Papers, 2006 IEEE International Solid-State Circuits Conference, San Francisco, CA Feb. 5-9, 2006, pp. 1830-1839.
Vahidfar M B et al., "An IIP2 Calibration Technique for CMOS Multi-Standard Mixers", Circuits and Systems, 2008, IEEE International Symposium on, May 18, 2008, pp. 916-919.

* cited by examiner

*Primary Examiner* — Blane J Jackson
(74) *Attorney, Agent, or Firm* — Patent Law Group LLP; Brian D. Ogonowsky

(57) ABSTRACT

A technique for cancelling out target IM2 components in a wireless receiver's mixer output is disclosed. A differential RF signal and a differential local oscillator (LO) signal are mixed by a mixer to demodulate the RF signal. A first common node signal is generated between a first resistor and a second resistor coupled across the mixer's differential output terminals. A second common node signal is generated between a third resistor and a fourth resistor coupled across the differential output terminals, where a capacitor is coupled between the second common node and a power supply terminal. The second common node signal provides a stable reference signal for IM2 components above a certain frequency. The two common node signals are subtracted to create a difference signal. The difference signal is scaled by a scaling factor obtained during calibration. The scaled difference signal is coupled to the mixer output to offset IM2 distortion.

17 Claims, 3 Drawing Sheets

SECOND ORDER INTERMODULATION CANCELLER

FIELD OF THE INVENTION

This invention relates to a circuit in a wireless receiver's demodulator that substantially cancels second-order intermodulation distortion (IM2) in a mixer's output.

BACKGROUND

Direct conversion RF receivers are widely used. In such a receiver, the transmitted modulated RF signal is downconverted by mixing the RF signal with a local oscillator (LO) signal having about the same frequency as the carrier. The mixer subtracts the LO signal from the RF signal, leaving the baseband signal for further processing by the receiver. When two frequencies are mixed within a circuit generating some inherent distortion, or if there is some RF interference, intermodulation (IM) products exist. Some IM products can be filtered out and others are difficult to accurately filter out. In the case of a direct conversion RF receiver, a second-order intermodulation (IM2) component frequency is likely to be very close to, or within the bandwidth of, the baseband signal, making it difficult to filter out. Hence, it is desirable to provide a non-filtering circuit to remove such IM2 distortion.

Various methods have been used to remove such IM2 distortion in a differential demodulator. Such methods, however, are fairly complex and require significant silicon real estate to fabricate. The IM2 canceller of U.S. Pat. No. 8,000,676, for example, uses two feedback loops and requires two reference voltages to be generated to offset IM2 distortion of a common mode signal in a demodulator circuit of a direct conversion RF receiver.

What is needed is a simpler and smaller IM2 canceller for a differential demodulator.

SUMMARY

One embodiment of the invention is a direct conversion wireless receiver that receives a modulated RF signal. The RF signal is converted into a differential RF signal. A differential mixer has differential inputs connected to receive the RF signal and a differential LO signal of a frequency about the same as the carrier signal. The differential outputs of the mixer are connected to a power supply voltage Vcc via matched load resistors. The baseband differential output is taken across the load resistors.

The mixer mixes the RF signal and the LO signal to generate a differential baseband signal. The differential baseband signal may be differential positive and negative signals, ideally relative to a stable DC value. Due to inherent distortion by the mixer, or due to RF to LO leakage interference, IM2 products are generated, which are to be desirably cancelled. The IM2 products may be present in the output as common-mode and differential signals. The common-mode IM2 signal is substantially cancelled by differential baseband amplifiers or differential analog-to-digital converters that are later stages in the signal path, but any residual differential IM2 signal is not cancelled. The IM2 products generated by the inherent distortion of the mixer cause the output common-mode signal to vary, such as with the amplitude of the RF signal, rather than be zero or a stable DC voltage. This common-mode IM2 signal can be used to cancel the differential IM2 distortion in the differential baseband signal.

The invention detects the difference between the varying common-mode signal and a reference voltage and directly compensates the baseband signal based on this difference signal to effectively cancel the IM2 products of interest in the baseband signal.

A first resistor and matched second resistor are connected in series across the mixer's differential outputs. The signal at the common node of the two resistors is connected to the input of a first differential amplifier. In an ideal receiver, this first common node signal would be a fixed DC common-mode signal. However, due to inherent distortion by the mixer, or due to interference, this first common node signal will vary, distorting the baseband output of the mixer.

A third resistor and matched fourth resistor are also connected across the differential mixer output, and their common node is connected to Vcc via a capacitor, effectively creating an AC ground above a certain frequency. Thus, this second common node of the third and fourth resistors will be referenced to DC. This second common node signal acts as a reference voltage and is applied to the other input of the first differential amplifier. The first differential amplifier thus outputs a differential signal corresponding to the difference between the two common node signals.

During initial calibration of the receiver during fabrication, the user performs a test on the receiver to derive a scaling factor between −1 to +1 to apply to the output of the first differential amplifier, where the scaled output of the first differential amplifier is applied to the differential baseband signal (the mixer output) to cancel out the IM2 signal. If the user wishes to cancel out IM2 distortion caused by RF interference, the user simulates the interference with a 2-tone test and generates a scaling factor to cancel out the calculated IM2 distortion in the baseband signal. The user may employ a digital signal processor to calculate the IM2 effects on the baseband signal under the test parameters, then generate the scaling factor needed to offset the IM2 effects.

During operation of the receiver, the user applies the scaling factor, such as by applying a certain voltage to one or more pins of the receiver. The receiver then dynamically offsets the IM2 distortion as the first common node signal varies during operation and differs from the stable second common node signal.

Instead of the mixer output being a baseband signal, it may be an intermediate frequency (IF) signal. Other embodiments are described.

DETAILED DESCRIPTION

Figure 1:
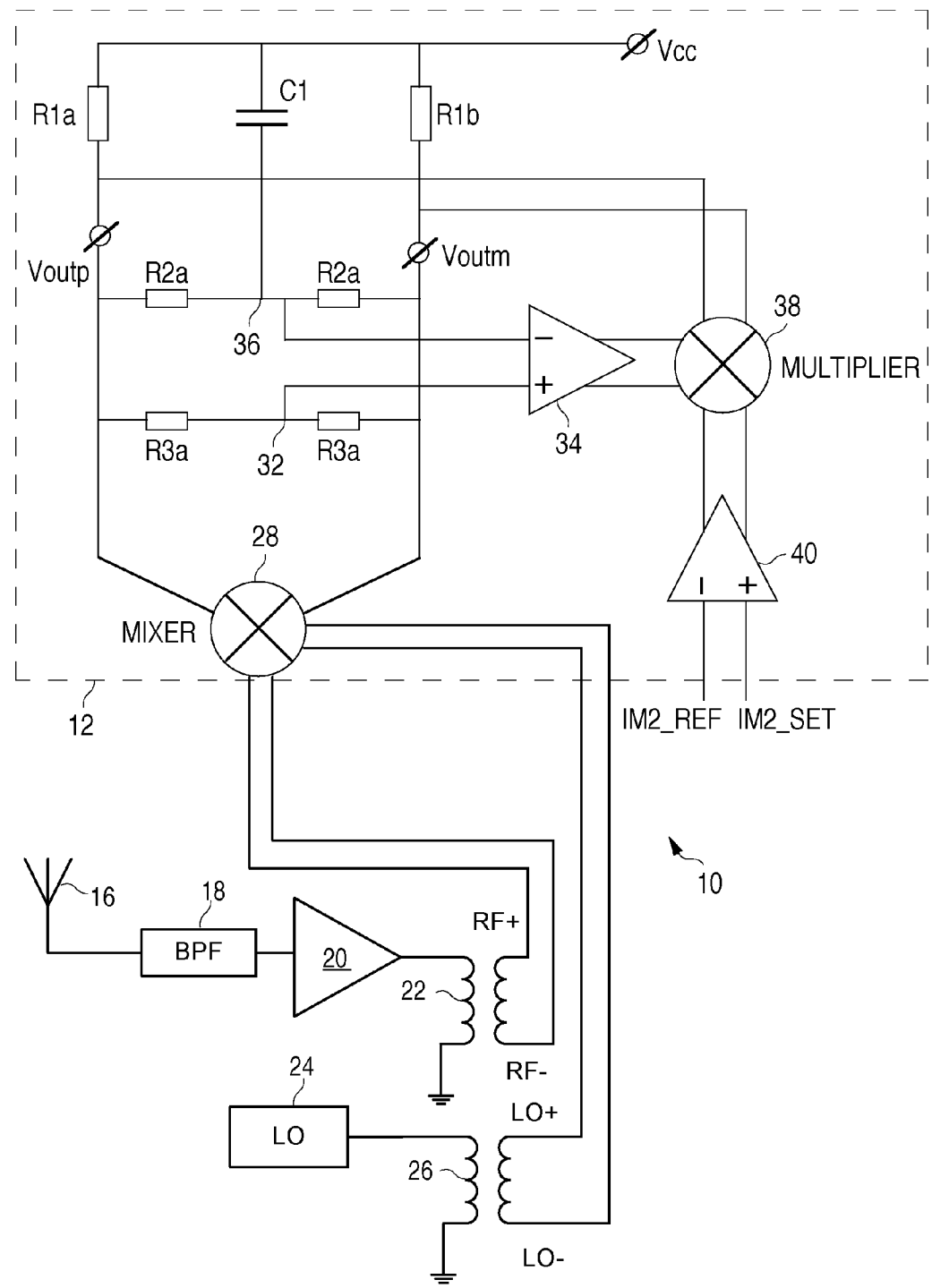
FIG. 1 illustrates one embodiment of the invention incorporated in a wireless RF receiver.

FIG. 1 illustrates one embodiment of the invention incorporated in a direct conversion wireless receiver 10 that receives a modulated RF signal. In one embodiment, the demodulator portion 12 is formed on a single IC except for the capacitor C1. The capacitor may be formed on-chip or off-chip. The receiver 10 may be a cell phone receiver, a keyless entry receiver in an automobile, or part of any other device.

An antenna 16 receives an RF signal, which will typically be a carrier modulated by a baseband signal. The baseband signal may amplitude-modulate the carrier, frequency or phase-modulate the carrier, or modulate the carrier in another manner.

A bandpass filter 18 passes the RF frequencies of interest to a low noise amplifier 20. A transformer 22 creates a differential RF signal, RF+ and RF−.

A local oscillator (LO) 24 generates a frequency that may be about the midpoint of the bandwidth of interest in the RF signal. The LO signal is converted to a differential LO signal, LO+ and LO−, by a transformer 26.

In the example used, there may be undesirable RF interference by RF signals close to the RF signal of interest, such as by RF/LO leakage. Such a combination of frequencies will create IM2 products having a frequency close to the baseband frequency or within the bandwidth of the baseband signal. IM2 products may also be generated by distortion when mixing the LO and RF signals or by other attributes in the receiver 10. The IM2 products of interest cannot be filtered out due to their proximity to the baseband signal.

The RF signal is downconverted (or demodulated) by a mixer 28, which subtracts the LO frequency from the RF carrier frequency, leaving the baseband signal, although somewhat distorted by the IM2 products.

The mixer 28 may be any conventional design. The output of the mixer 28 is a differential baseband signal with the carrier removed. The differential output terminals of the mixer 28 are connected to the power supply voltage Vcc via matched load resistors R1a and R1b, which will typically be 50 ohms. The baseband differential output is taken across the load resistors R1a and R1b. In FIG. 1, the terminals Voutp and Voutm convey positive and minus differential baseband signals, relative to a common mode voltage, and are provided on pins on the demodulator 12 IC.

The baseband signal may be optionally low pass filtered to remove any undesired signals of higher frequency than the band of interest. The differential baseband signal is then processed in a conventional manner.

A resistor R3a and matched second resistor R3b are connected in series across the mixer's differential outputs. The signal at the common node 32 of the two resistors is connected to the input of a differential amplifier 34, having a fixed gain. In an ideal receiver, this common node 32 signal would be a fixed DC signal. However, due to inherent distortion by the mixer 34, or due to interference, this common node 32 signal will vary due to IM2 products, distorting the baseband output of the mixer 28. In one embodiment, Vcc is 5 volts, and the range of the baseband signals is 2-5 volts. If the baseband signal is digital (either 2 volts or 5 volts), and the performance is ideal, the common node 32 should be a relatively stable 3.5 volts.

A resistor R2a and matched resistor R2b are also connected across the differential mixer 28 output, and their common node 36 is connected to Vcc via a capacitor C1, effectively creating an AC ground above a certain frequency. Thus, this common node 36 will be referenced to DC at a sufficiently high frequency (preferably the minimum frequency of the IM2 components). This common node 36 signal acts as a DC reference voltage and is applied to the other input of the differential amplifier 34. The differential amplifier 34 thus outputs a differential signal corresponding to the difference between the two common node signals. In other words, the output of the differential amplifier 34 corresponds to the distortion in the common-mode of the differential baseband signal due to the IM2 products of interest. If the baseband signal is digital (2 volts or 5 volts), then the common node 36 should be at a relatively stable 3.5 volts if the IM2 frequency is high enough.

The values of resistors R2a, R2b, R3a, and R3b are preferably matched for simplicity. The matched value of resistors R2a, R2b, R3a, and R3b is much greater than the value of the load resistors R1a and R1b so as not to significantly attenuate the signal. In one embodiment, the value of the resistors R2a, R2b, R3a, and R3b is 1 Kohm, and the load resistors R1a and R1b are 50 ohms.

As the amplitude of the RF signal changes, or if the RF interference changes, the common node 32 signal will vary due to a change in the IM2 products; however, the common node 36 signal should not change and acts as a reference. The output of the differential amplifier 34 reflects the distortion due to the IM2 products, but the output of the differential amplifier 34 needs to be scaled before being applied to the baseband signal.

During an initial calibration of the receiver 10 during fabrication of the receiver 10, the user performs a test on the receiver 10 to derive a scaling factor between −1 to +1 to apply to the output of the differential amplifier 34, where the scaled output of the differential amplifier 34 is applied to the differential baseband output to cancel out the IM2 distortion under the test conditions. Thus, the proper scaling factor is that which results in minimum IM2 distortion under the calibration conditions. If the user wishes to cancel out IM2 distortion caused by RF interference, the user simulates the expected interference with a 2-tone test and generates a scaling factor to cancel out the effects of IM2 distortion on the baseband signal. A similar test is performed if the user desires to cancel IM2 distortion due to distortions generated by the receiver circuitry itself. The user may employ a digital signal processor (DSP) to calculate the IM2 effects on the baseband signal under the test parameters, then the user adjusts the scaling factor needed to offset the calculated IM2 effects by subtracting from or adding to the baseband signal. One-dimensional search algorithms such as golden-section search, backtracking, or Newton's method can be used.

During operation of the receiver 10, the user applies the scaling factor to the output of the differential amplifier 34, such as by applying a certain voltage to one or more pins of the receiver. The receiver then dynamically offsets the IM2 distortion in the mixer output as the common node 32 signal differs from the stable common node 36 signal.

In the example of FIG. 1, the scaling of the output of the differential amplifier 34 is performed by a multiplier 38, which may be conventional. A differential amplifier 40 receives IM2_Ref and IM2_Set signals, derived by the DSP as previously described, and outputs the scaling factor between +1 and −1 (depending on the relative magnitudes of the IM2_Ref and IM2_Set signals). In one embodiment, the user supplies the fixed IM2_Ref and IM2_Set signals via pins on the demodulator 12 IC. Other methods may be used to generate a value between +1 and −1 to scale the output of the differential amplifier 34, based on an empirical test of the receiver 10.

The scaled differential signals are then applied to the differential baseband signal to offset the IM2 products of interest as the common node 32 signal varies during operation by the receiver 10.

The system is calibrated (to derive the scaling factor) using IM2 components having a frequency much higher than the cutoff frequency of the resistor-capacitor network, where the impedance of the capacitor C1 is effectively zero. Therefore, IM2 components with a frequency substantially higher than the cutoff frequency of the resistor-capacitor network will be accurately offset. At much lower frequencies, where the impedance of the capacitor C1 is significantly greater than zero, the common node 36 signal will not have the proper amplitude and phase, so the IM2 cancellation will not be as precise. The values of the capacitor C1 and resistors are adjusted to set the cutoff frequency. This is described in more detail below.

The 3 dB cut-off frequency (or corner frequency) of the capacitor-resistor combination is given as: $fk=1/((R2a\|R2b)*C1*2*pi)$.

IM2 components with a frequency below fk will not be amplified by the differential amplifier 34 with the right phase and amplitude if IM2 calibration is done using a signal with IM2 component frequencies >>fk. Therefore, the IM2 cancellation will not be as effective.

The frequency response of the filter using R2a, R2b and C1 is given by: $H(f)=1/(1+j*(f/fk))$, assuming R1a, R1b<<R2a, R2b.

The IM2 cancellation capability will follow the same shape since the differential amplifier 34 and multiplier 38 are assumed to have constant gain vs frequency.

Therefore, at the corner frequency fk, the IM2 components will only be cancelled by 3 dB. At 10*fk, the IM2 components will be cancelled by 20 dB. At 100*fk the IM2 components will be cancelled by 40 dB, if all other blocks are assumed to be ideal.

In practical situations, the IM2 intercept point (IP2) improvement will be about 20 dB. Therefore, it is recommended to select the resistor R2a and R2b and capacitor C1 values such that the corner frequency fk is less than one-tenth the minimum frequency of the IM2 components of interest.

A very low corner frequency fk will increase settling time, and a good trade-off needs to be made for fk.

At very high IM2 frequencies, delay and gain roll-off of the differential amplifier 34 and multiplier 38 may adversely affect the cancellation for those IM2 components.

The compensation circuit automatically adjusts for process variations, temperature variations, and supply voltage variations, due to the voltages at the common nodes 32 and 36 similarly tracking with such variations.

Although the invention was described with respect to a direct conversion receiver where the output of the mixer is a baseband signal, it may also be applied to certain receivers that generate an intermediate frequency (IF). For example, the invention is useful when the receiver uses a low-IF and the baseband signal bandwidth is the same order of magnitude as its center frequency, or when the receiver uses an IF signal and the baseband signal bandwidth is much smaller than its center frequency.

The demodulator 12 can be a part of many types of receivers, such as direct conversion quadrature receivers, where in-phase and quadrature signal paths are employed, and the invention is used in each path. The baseband signal may be digital or analog and may use FSK, ASK, or other standards. In one embodiment, the demodulator is a separate IC that is a component in a receiver.

Figure 2:
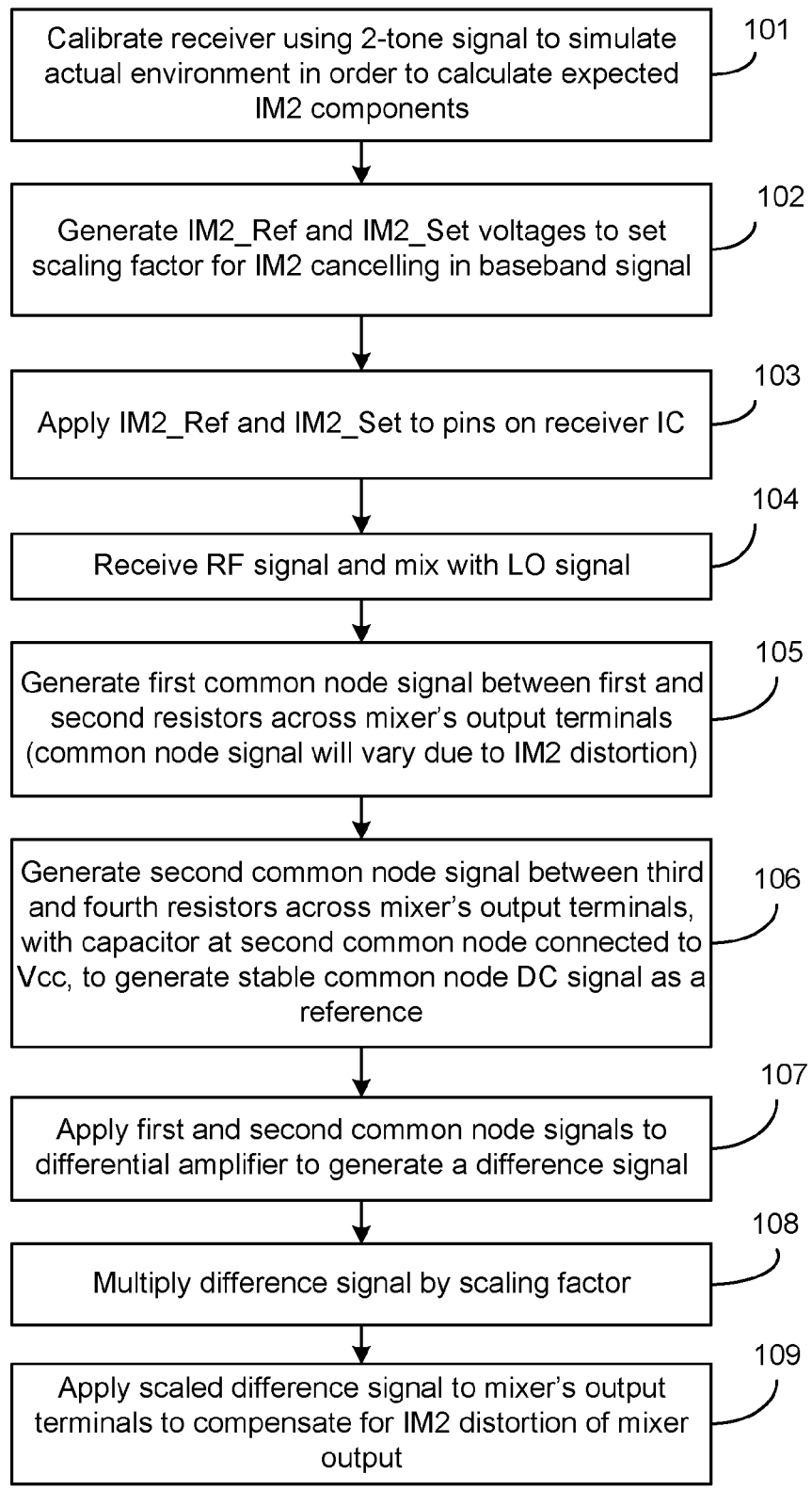
FIG. 2 is a flowchart identifying certain steps employed in the invention.

FIG. 2 summarizes one embodiment of method employing the present invention. It is assumed that the user wishes to calibrate the receiver to cancel IM2 components that occur due to an interfering RF signal at a frequency close to the desired RF signal.

In step 101, the user calibrates the receiver using a 2-tone RF signal to simulate the actual environment having the interfering signal.

In step 102, the user uses a DSP to identify the IM2 Ref and IM2 Set scaling voltages needed for cancelling the IM2 components derived during calibration.

In step 103, the user applies the IM2 Ref and IM2 Set scaling voltages to pins of the demodulator IC to create a scaling factor between +1 and −1.

In step 104, the receiver operates and mixes the received RF signal (containing interference) with a LO signal.

In step 105, the mixer generates a differential output signal (e.g., a baseband signal), and the resistors R3a and R3b provide a first common node signal that varies during operation, where the variation is related to the IM2 components. The first common node signal may vary with the RF signal amplitude due to the IM2 components.

In step 106, the capacitor C1 and resistors R2a and R2b provide a second common node signal that is relatively stable due to C1 acting as an AC short to the power supply. This signal acts as a reference voltage representing a lack of IM2 distortion.

In step 107, the two common node signals are applied to the differential amplifier 34 to generate a difference signal.

In step 108, the difference signal is scaled (or multiplied) by a scaling factor based on the calibration signals IM2_Ref and IM2_Set.

In step 109, the scaled difference signal is applied to the outputs of the mixer (assumed to be a baseband signal) to compensate for the IM2 distortion of the baseband signal.

Other methods may also be employed depending on the nature of the IM2 distortion and other factors.

Figure 3:
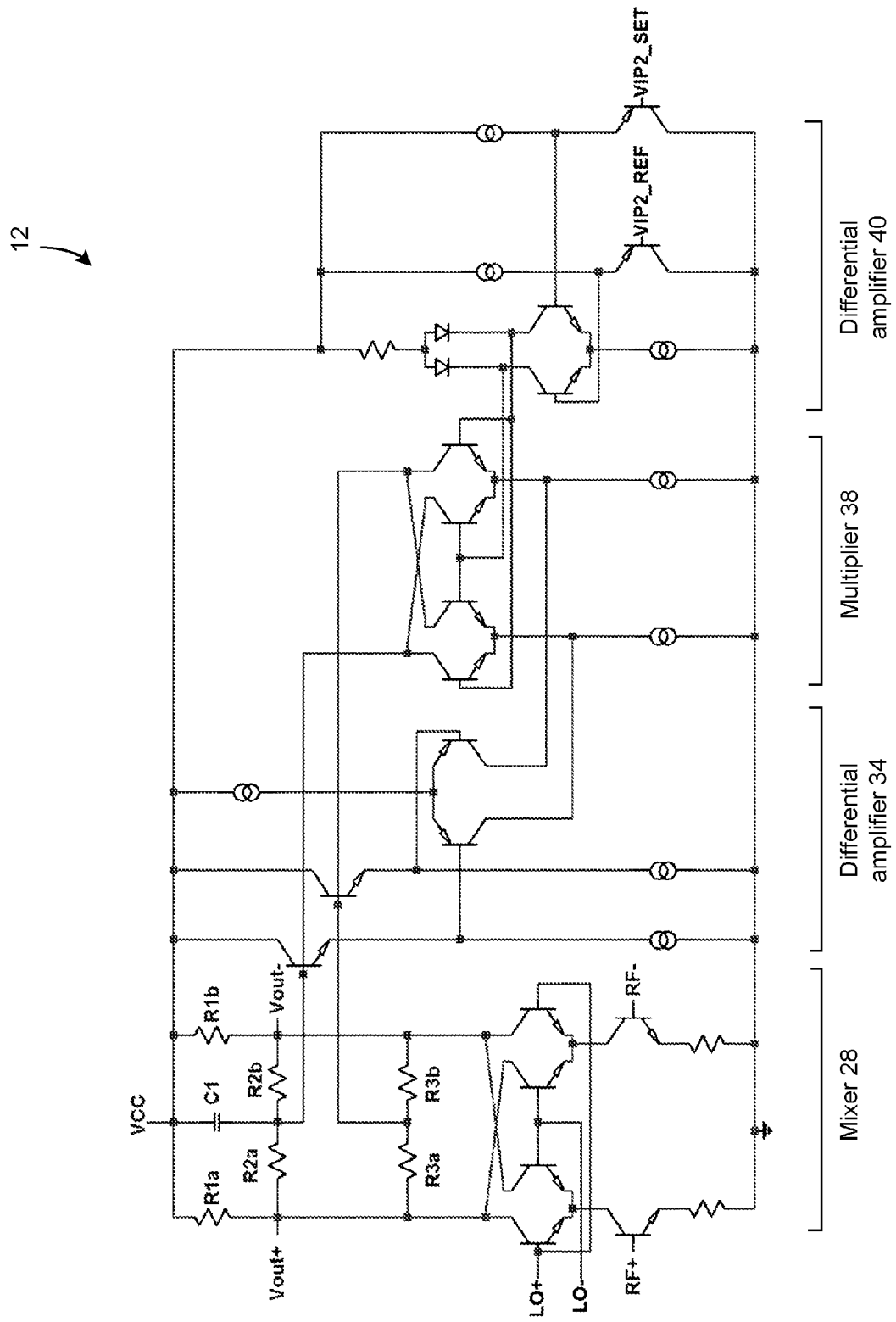
FIG. 3 is a transistor level schematic diagram that corresponds to the circuit of FIG. 1.

FIG. 3 is a transistor level schematic diagram that corresponds to the circuit of FIG. 1. The circuit is self-explanatory to those skilled in the art after reading the present disclosure.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A circuit comprising:
    a demodulator comprising:
        a mixer receiving a differential RF signal and a differential local oscillator (LO) signal, the mixer having differential output terminals outputting a first differential output signal;
        a first resistor and a matched second resistor coupled in series across the differential output terminals and having a first common node;
        a third resistor and a matched fourth resistor coupled in series across the differential output terminals and having a second common node;
        a capacitor coupled between the second common node and a reference source;
        a first differential amplifier having inputs coupled to the first common node and the second common node and generating a second differential output signal;
        a scaler coupled to the first differential amplifier for scaling the second differential output signal, the scaler generating a third differential output signal,
        the third differential output signal being applied to the differential output terminals of the mixer to at least partially offset distortions caused by second-order intermodulation (IM2) components.

2. The circuit of claim 1 wherein the demodulator is part of a direct conversion receiver.

3. The circuit of claim 1 wherein the circuit is a receiver, the circuit further comprising:
    an antenna receiving an RF signal;
    a converter for converting the RF signal into the differential RF signal; and
    the local oscillator.

4. The circuit of claim 1 wherein values of the first resistor, the second resistor, the third resistor, and the fourth resistor are substantially matched.

5. The circuit of claim 1 wherein the scaler comprises:
a second differential amplifier having one or more scaling factor signals applied to inputs of the second differential amplifier, the second differential amplifier outputting a fourth differential output signal; and
a multiplier coupled to receive the second differential output signal and the fourth differential output signal, the multiplier outputting the third differential output signal.

6. The circuit of claim 1 wherein at least a portion of the demodulator is formed as an integrated circuit (IC), wherein one or more scaling factor signals setting a scaling factor for the scaler are applied to terminals external to the IC.

7. The circuit of claim 1 wherein one or more scaling factor signals are applied to the scaler for setting a scaling factor of the scaler, wherein the one or more scaling factor signals are calculated during a calibration of the demodulator to substantially minimize IM2 components in the first differential output signal under calibration conditions.

8. The circuit of claim 1 wherein the first differential output signal is a baseband signal.

9. The circuit of claim 1 wherein the first differential output signal is an intermediate frequency (IF) signal.

10. The circuit of claim 1 wherein the capacitor is coupled between the second common node and a power supply terminal.

11. A method for reducing second-order intermodulation (IM2) components in a mixer output comprising:
mixing a differential RF signal and a differential local oscillator (LO) signal by a mixer, the mixer outputting a first differential output signal on differential output terminals;
generating a first common node signal at a first common node between a first resistor and a second resistor coupled across the differential output terminals, the first common node signal varying at least in part due to an IM2 component;
generating a second common node signal at a second common node between a third resistor and a fourth resistor coupled across the differential output terminals, where a capacitor is coupled between the second common node and a reference terminal, the second common node signal providing a reference signal;
applying the first common node signal and the second common node signal to a first differential amplifier to obtain a difference signal;
multiplying the difference signal by a scaling factor to generate a differential correction signal; and
applying the differential correction signal to the first differential output signal to reduce IM2 distortion.

12. The method of claim 11 further comprising calibrating the first differential output signal under test conditions to generate the scaling factor needed to reduce the IM2 distortion.

13. The method of claim 12 wherein the calibrating comprises applying a 2-tone signal to the mixer.

14. The method of claim 12 wherein the calibrating comprises generating a scaling factor between +1 and −1 to be multiplied by the output of the difference signal.

15. The method of claim 12 wherein the calibrating comprises:
deriving a reference voltage and a set voltage;
applying the reference voltage and set voltage to a second differential amplifier, an output of the second differential amplifier providing the scaling factor;
multiplying the difference voltage by the scaling factor,
wherein the reference voltage and the set voltage are determined based on a resulting differential correction signal at least partially offsetting distortion in the first differential output signal caused by IM2 components.

16. The method of claim 15 wherein the first differential output signal is a baseband signal.

17. The method of claim 15 wherein the first differential output signal is an intermediate frequency (IF) signal.

* * * * *